United States Patent [19]

Thornock

[11] Patent Number: 4,592,508
[45] Date of Patent: Jun. 3, 1986

[54] TRANSLATING JET ENGINE NOZZLE PLUG

[75] Inventor: Russel L. Thornock, Seattle, Wash.

[73] Assignee: The Boeing Company, Seattle, Wash.

[21] Appl. No.: 563,419

[22] Filed: Oct. 27, 1983

[51] Int. Cl.[4] .............................................. F02K 1/50
[52] U.S. Cl. ................................. 239/265.19; 60/240; 60/242
[58] Field of Search ........... 239/265.19, 533.1, 265.11, 239/265.13, 265.23, 265.25, 265.27, 265.29, 265.31; 60/240, 242; 137/461; 91/415, 449, 454

[56] References Cited

U.S. PATENT DOCUMENTS

| | | | |
|---|---|---|---|
| 2,402,363 | 6/1946 | Bradbury | 60/242 |
| 2,540,594 | 2/1951 | Price | 60/240 |
| 2,563,745 | 8/1951 | Price | 60/35.6 |
| 2,857,119 | 10/1958 | Morguloff | 244/52 |
| 3,552,873 | 1/1971 | Ghougasian | 415/49 |
| 3,650,110 | 3/1972 | Ghougasian | 60/230 |
| 3,807,639 | 4/1974 | Soligny et al. | 239/265.19 |
| 3,810,360 | 5/1974 | Leibach | 60/229 |

FOREIGN PATENT DOCUMENTS

860754 12/1952 Fed. Rep. of Germany .
996461 6/1965 United Kingdom .................. 60/242

*Primary Examiner*—James B. Marbert
*Attorney, Agent, or Firm*—Joan H. Pauly

[57] ABSTRACT

A plug (24) has a fixed portion (26, 28) and a sliding portion (34). A tapered outer surface of portion (34) is adjacent to the throat (22) of a jet engine nozzle (20). Portion (34) includes two expansible chambers (36, 38) which are both defined by wall portions of both the fixed and the sliding portions of plug (24). Chambers (36, 38) are separated by a bulkhead (48) carried by said fixed portion. Chambers (36, 38) are supplied with fluid pressure which acts against a pressure surface (40, 42) to move sliding portion (34) axially forwardly and aftwardly, respectively, to in turn vary the throat area. Bleed air from the engine compressor supplies the fluid pressure. Fluid pressure is continuously supplied to chamber (38). Controlled leakage out of chamber (36) provides gradual slowing of movement of portion (34) in either direction. Control apparatus is located remotely from the nozzle (20).

25 Claims, 12 Drawing Figures

TRANSLATING JET ENGINE NOZZLE PLUG

DESCRIPTION

1. Technical Field

This invention relates to power device nozzles and, more particularly, to such a nozzle in a jet engine which has a translating pneumatically operated plug for varying the nozzle throat area, and in which there is a single moving part in the hostile nozzle environment.

2. Background Art

Thrust reversers in jet aircraft are well-known in the art and take a variety of forms. A thrust reverser redirects a portion of the flow from a jet engine in a generally forward direction to provide a braking action when the aircraft is landing. The net braking force is equal to the reverse thrust of the redirected flow less the forward thrust of the unredirected flow. Thus, the reverse force may be increased by lessensing the thrust of the unredirected flow. This can be done by reducing the amount of aftward flow or by reducing the pressure in the nozzle and thus reducing the thrust of the aftward flow.

In current high-bypass ratio turbofan installations, serious problems have arisen that tend to defeat efforts to achieve satisfactory reverse thrust performance. In turbofan installations, the fan flow and primary flow occupy separate exhaust nozzle ducts. In early turbofan installations, primary thrust reversers were provided to redirect the primary flow. Because of the severe environment in the exhaust nozzle duct occupied by the primary flow, the primary thrust reversers failed at an unacceptably high rate. This high failure rate led to the elimination of primary thrust reversers in most high-bypass ratio turbofan installations. With the primary thrust reverse eliminated, there was of course a total reliance on redirecting the fan flow to provide reverse thrust and the forward thrust of the unredirected primary flow acted to counter the reverse thrust of the redirected fan flow. In recent twin engine commercial airplane designs, such as the Boeing 767 and 737-300, the proximity of the engine nacelle to both the fuselage and the runway has led to compromises in the fan thrust reverser efficiency. This has further reduced the available reverse thrust.

Varying the throat area and/or exit area of a jet engine nozzle by sliding all or part of a nozzle plug is well-known in the art. A number of approaches to providing a sliding plug have been proposed to accomplish various purposes. These approaches include arrangements both with and without redirection of the flow. A basic problem associated with known systems having translating plugs is that moving parts and control apparatus are located in the severe environment of the primary flow of the jet engine. The severe environment tends to shorten the useful life of the moving parts and control apparatus and to increase the failure rate. This in turn increases the cost of operating the system and reduces its reliability and safety of operation.

Each of the following patents discloses a jet engine nozzle that has a translating part or parts which vary the configuration of the flow path of the nozzle:

U.S. Pat. No. 2,563,745, granted Aug. 7, 1951, to N. C. Price;
U.S. Pat. No. 2,857,119, granted Oct. 21, 1958, to D. Morguloff;
U.S. Pat. No. 3,552,873, granted Jan. 5, 1971, to J. N. Ghougasian;
U.S. Pat. No. 3,650,110, granted Mar. 21, 1972, to J. N. Ghougasian;
U.S. Pat. No. 3,807,639, granted Apr. 30, 1974, to M. R. Soligny et al;
U.S. Pat. No. 3,810,360, granted May 14, 1974, to H. Leibach; and
West German Pat. No. 860 754, granted to E. Ubelacker, published Dec. 22, 1952.

In the devices disclosed by Price and Soligny et al, a member inside the nozzle is translated to control operation of the engine turbine and/or to accommodate afterburner operation. Both devices apparently function in a forward thrust mode only. The apparatus disclosed by Price includes a translating ring that is moved by pneumatic actuators that are mechanically linked to the ring. Soligny et al disclose a translating plug that is moved by jackscrews which are mechanically linked to the plug.

In each of the devices disclosed in the Morguloff patent, the two Ghougasian patents, and the German patent, a translating plug is deployed to close off the nozzle while the flow is redirected. In the Morguloff device, a separate mechanism is provided for redirecting the flow. The operation of the plug and the redirecting mechanism are coordinated. Both of the Ghougasian patents disclose the same nozzle and plug arrangement. In this arrangement, when the movable piston portion of the plug is seated against the outer nozzle sleeve, it moves this outer section aftwardly to open up ducts that redirect flow in a forward direction. The translating piston portion of the plug is apparently pneumtically operated and is positioned within a cylinder in order to provide aftward pneumatic movement. The means for providing forward movement is not clear. In the German patent, translation of a plug into an aft seated position which closes off the exhaust nozzle apparently causes the thrust reverser means to be uncovered. The means of translating the plug appears to be a jackscrew.

The Leibach patent describes a system in which inner and outer sleeves are translated in order to cause the exhaust of a gas turbine to pass through another turbine to extract mechanical power or, alternatively, to cause such exhaust to bypass the turbine when no power extraction is required. When both sleeves are translated forward, they together cause the exhaust flow to go through the second power removal turbine. When both sleeves are translated aft, the exhaust flow is directed around the power removal turbine.

The above patents and the prior art that is discussed and/or cited therein should be studied for the purpose of putting the present invention into proper perspective relative to the prior art.

DISCLOSURE OF THE INVENTION

A subject of this invention is apparatus for varying the cross-sectional area of a flow path in an exhaust nozzle of a power device. According to an aspect of the invention, the apparatus comprises a nozzle plug having a fixed portion and a sliding portion. Each of these portions includes first and second chamber wall means. The first chamber wall means of said portions together define a first expansible chamber, and the second chamber wall means of said portions together define a second expansible chamber. Support means is provided for supporting the plug in position at least partially within an exhaust nozzle of a power device. First operating means introduces fluid pressure into the first expansible chamber to act against a portion of the first chamber wall means of said sliding portion, to cause said sliding portion to slide axially inwardly with respect to the nozzle. Second operating means introduces fluid pressure into the second expansible chamber to act against a portion of the second chamber wall means of said sliding portion, to cause said sliding portion to slide axially outwardly with respect to the nozzle. The cross-sectional area of the plug, at each axial station along at least a portion of the axial length of the plug, changes when the sliding portion slides axially, to change the cross-sectional area of an adjacent portion of the nozzle flow path.

According to another aspect of the invention, one of the expansible chambers is located axially inward of the other of the expansible chambers, and the expansible chambers are separated by a bulkhead that is part of the fixed portion of the plug.

According to still another aspect of the invention, the sliding portion has an axial opening, the fixed portion includes a center axial beam which projects into this opening and on which the sliding portion slides, and the first and second chamber wall means of the fixed portion are formed by outer wall portions of the beam. Preferably, each of the first and second operating means includes tubing extending through said beam to convey pressurized fluid to the first and second expansible chambers, respectively.

A feature of the invention is a fixed portion of the plug that is cantilevered and includes a center axial beam on which the sliding portion slides, and an essentially coaxial sleeve into which an inner end portion of the sliding portion is received when the sliding portion slides inwardly with respect to the nozzle.

According to another aspect of the invention, fluid pressure is continuously supplied by one of the first and second operating means to the respective expansible chamber to bias the sliding portion of the plug in a desired axial direction.

Another feature of the invention is the provision of inward stop means and outward stop means for gradually stopping inward and outward axial sliding movement of the sliding portion of the plug, respectively. Yet another feature of the invention is the provision of control means for controlling the first and second operating means to thereby control the position of the sliding portion of the plug. This control means preferably includes sensor means for sensing the position of the sliding portion, and valve means located outside the nozzle for regulating the supply of fluid pressure to each chamber.

Another subject of the invention is apparatus for varying a throat area in a nozzle of a jet engine in a jet aircraft. According to an aspect of the invention, the apparatus comprises a nozzle plug having a fixed portion and a sliding portion with a tapered aft end portion. Each of the fixed and sliding portions includes first and second chamber wall means. The first chamber wall means of said portions together define a first expansible chamber, and the second chamber wall means of said portions together define a second expansible chamber. Support means is provided for supporting the plug in position at least partially within a nozzle of a jet engine with said tapered aft end portion adjacent to a throat portion of the nozzle. First operating means introduces fluid pressure into the first expansible chamber to act against a portion of the first chamber wall means of said sliding portion, to cause said sliding portion to slide axially with respect to the nozzle in one direction and thereby increase the nozzle throat area. Second operating means introduces fluid pressure into the second expansible chamber to act against a portion of the second chamber wall means of said sliding portion, to cause said sliding portion to slide axially with respect to the nozzle in the opposite direction and thereby decrease the nozzle throat area.

A feature of the invention is the location of one of the expansible chambers forward of the other of the expansible chambers and the separation of said chambers by a bulkhead that is part of the fixed portion of the plug. When the tapered aft end portion of the sliding portion of the plug is aftwardly tapered, the first expansible chamber is located forward of the second expansible chamber in embodiments with this feature.

According to another aspect of the invention, each of the first and second operating means includes tubing extending through the fixed portion of the plug to convey bleed air from an engine compressor to the first and second expansible chamber, respectively. In the preferred embodiment, this tubing extends through the center axial beam.

Other features of the invention include the continuous supply of fluid pressure by one of the first and second operating means to the respective expansible chamber to bias the sliding portion of the plug in a desired axial direction. Such other features also include the provision of forward stop means and aft stop means for gradually stopping forward and aftward axial sliding movement of the sliding portion of the plug, respectively. One of these stop means preferably includes controlled leakage means for allowing leakage of fluid out of one of the chambers at a predetermined rate as the sliding portion slides axially and said one chamber contracts, to allow controlled compression of fluid in said one chamber to slow the rate of movement of the sliding portion. In embodiments in which the sliding portion is biased axially in a desired direction by a continuous supply of fluid pressure in one of the chambers, preferably one of the stop means includes controlled leakage means for allowing leakage of fluid out of the other expansible chamber at a predetermined rate that increases as the sliding portion slides axially in a direction opposite to said desired direction and said other chamber expands, to gradually create an equilibrium between the force due to the fluid pressure in said other chamber tending to slide the sliding portion in said opposite direction and the force due to the fluid pressure in said respective chamber tending to slide the sliding portion in said desired direction. In the preferred embodiment, the fixed portion of the plug includes a center axial beam on which the sliding portion slides and the controlled leakage means includes an opening on the surface of the beam.

Apparatus constructed according to the invention has the advantage of being relatively simple in construction and operation. This simplicity makes such apparatus relatively inexpensive to manufacture and to maintain. In addition, the simplicity allows the number of moving parts to be kept at a minimum so that the reliability of the apparatus is increased and therefore the safety of an aircraft or other device into which the apparatus is incorporated is also increased. In systems in which apparatus constructed according to the invention has been incorporated, the equipment necessary for controlling the operation of the apparatus may easily be placed outside the nozzle of the device away from the generally severe environment of the nozzle. Therefore, there is greater flexibility in the choice of the design and structure of the control means and the control means is essentially free from problems of failure due to the exposure of sensitive control apparatus and moving parts to the severe nozzle environment.

The use of apparatus constructed according to the invention in high-bypass ratio turbofan installations solves the problems discussed above in relation to efforts to achieve satisfactory reverse thrust performance in such installations. By use of apparatus constructed according to the invention, it is possible to reduce the thrust of the primary aftward flow without locating thrust reversers with moving parts in the very severe environment of the primary flow. Thus, the previously encountered high failure rate of primary thrust reversers is avoided. The reduction of the thrust of the aftward flow makes it possible for redirected fan flow to provide more efficient braking action. This greater efficiency in braking action is obtained without regard to the degree of proximity of the engine nacelle to either or both of the fuselage and the runway, and helps to compensate for any loss in fan thrust reverser efficiency caused by compromises in reverser design necessitated by proximity of the engine nacelle to the fuselage and the runway. In short, in high-bypass ratio turbofan installations apparatus constructed according to the invention provides efficient, reliable, and safe braking action.

These and other advantages and features will become apparent from the detailed description of the best mode for carrying out the invention that follows.

BRIEF DESCRIPTION OF THE DRAWINGS

In the drawings, like element designations refer to like parts throughout, and.

BEST MODE FOR CARRYING OUT THE INVENTION

The drawings show apparatus that is constructed according to the invention and that also constitutes the best mode of the invention currently known to the applicant. In the drawings, the apparatus of the invention is shown incorporated into a jet aircraft for the purpose of controlling the pressure and thereby the thrust in the primary nozzle 20 of a jet engine on the aircraft. This is anticipated to be the primary application of the apparatus of the invention. However, it is of course to be understood that the apparatus of the invention may also be used to advantage in other environments in which it is desired to vary the cross-sectional area of the flow path in a nozzle of a power device.

Figure 1:
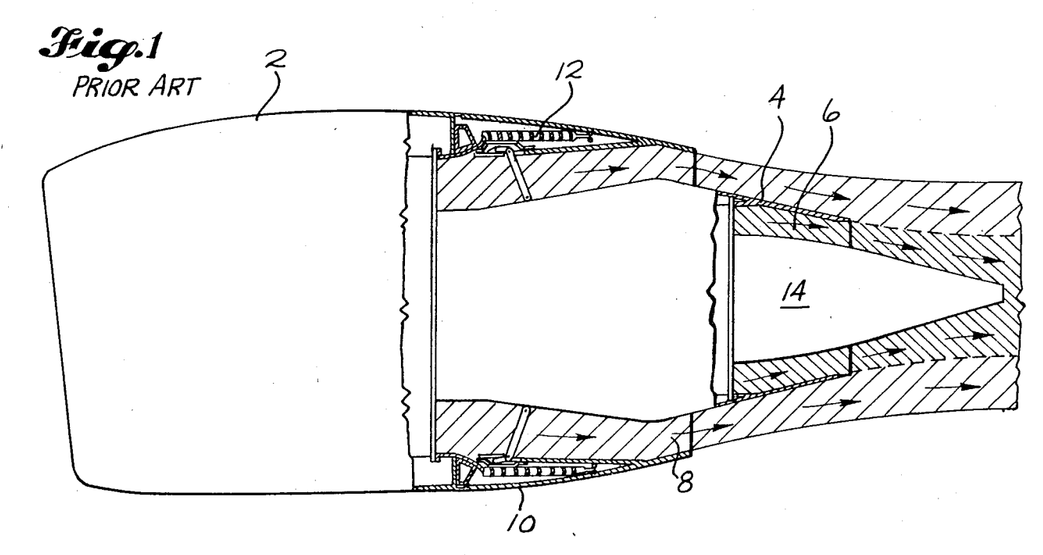
FIG. 1 is a side elevational view of a high-bypass ratio turbofan installation having fan thrust reversers, with the reversers shown in their forward mode position and with foreground portions of the installation cut away for purposes of illustration.
Figure 2:
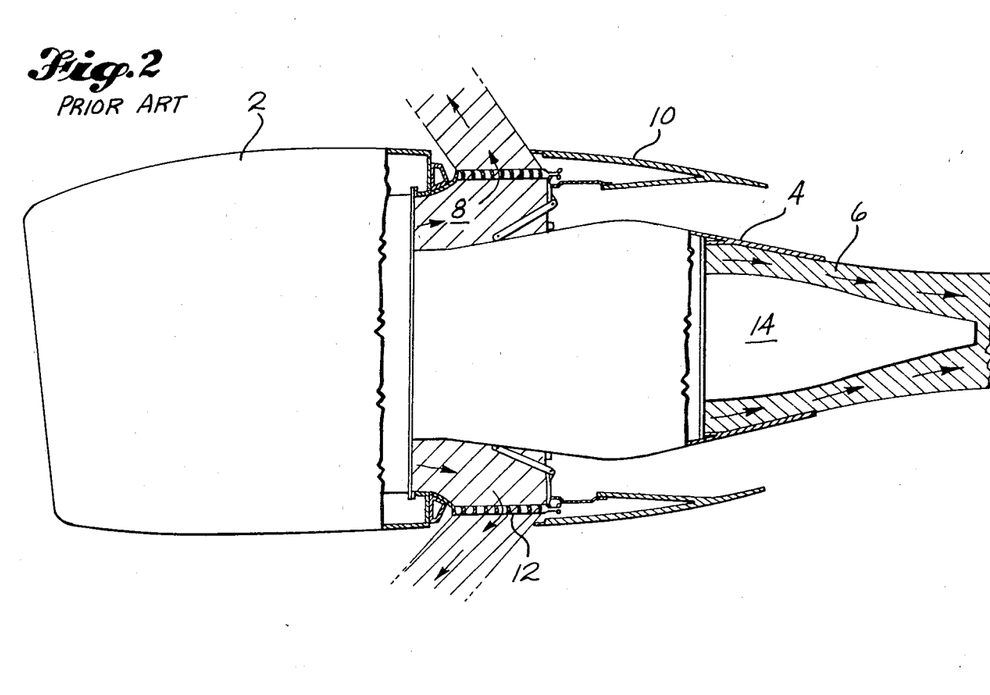
FIG. 2 is like FIG. 1 except that it shows the installation in its reverse thrust mode.

FIGS. 1 and 2 illustrate a typical known high-bypass ratio turbofan installation of a type into which apparatus constructed according to the invention may be incorporated to great advantage. The structure and functioning of such installations is well-known and will only be described briefly herein. As shown in FIGS. 1 and 2, the engine includes a primary nozzle 4 with a nacelle 2 and a primary nozzle plug 14 of a known construction. The engine flow is divided into two parts, the primary flow 6 through the primary nozzle 4 and the fan flow 8 surrounding the primary nozzle 4. Since this is a high-bypass ratio installation, the amount of fan flow relative to the primary flow is comparatively large. When reverse thrust is needed to provide braking action, a thrust reverser sleeve 10 is moved aftward to open thrust reverser cascades 12. This causes the fan flow 8 to be redirected in a generally forward direction. The system for redirecting the fan flow shown in FIGS. 1 and 2 is of a type well-known in the art and forms no part of the present invention. The system is illustrated herein for the purpose of providing an example of an installation into which the apparatus of the invention may be incorporated to great advantage. FIG. 1 shows the installation in its forward mode configuration, and FIG. 2 shows the installation in its reverse mode configuration.

Figures 3, 4, 5:
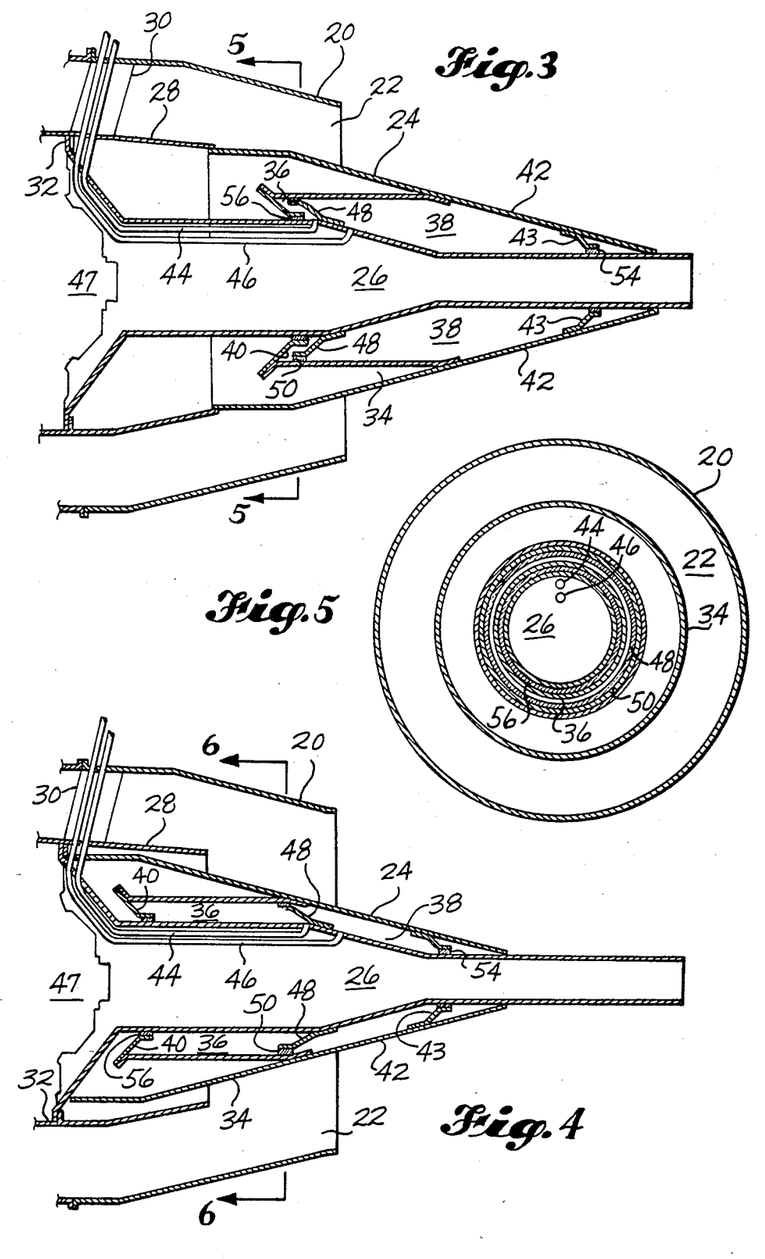
FIG. 3 is a sectional view of apparatus constructed in accordance with the preferred embodiment of the invention, with the sliding portion of the plug shown in its forward mode position.
FIG. 4 is like FIG. 3 except that it shows the sliding portion of the plug in its reverse mode position.
FIG. 5 is a cross-sectional view taken along the line 5—5 in FIG. 3.
Figure 6:
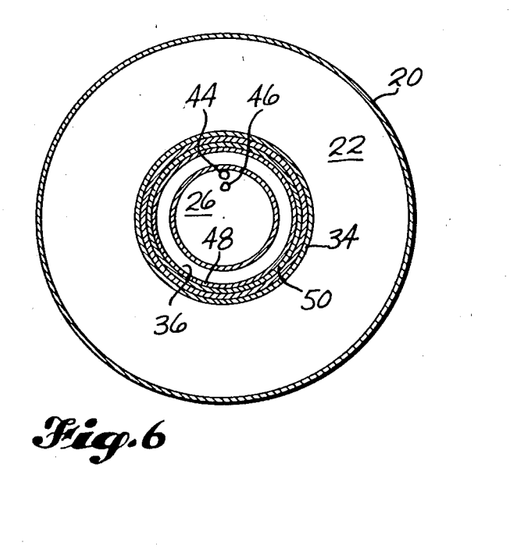
FIG. 6 is a cross-sectional view taken along the line 6—6 in FIG. 4.

FIGS. 3 and 4 show the preferred embodiment of the apparatus of the invention. The apparatus includes a cantilevered plug 24 that is installed in the primary nozzle 20 of an aircraft jet engine. The nozzle plug 24 has a fixed portion 26, 28 and a sliding portion 34. The sliding portion 34 has an aftwardly tapered aft end portion, and is moved axially with respect to the nozzle 20 in order to vary the throat area 22 of the nozzle 20 to improve the overall reverse thrust performance of the engine. FIG. 3 shows the sliding portion 34 in its stowed forward mode position. FIG. 4 shows the sliding portion 34 in its deployed reverse mode position.

The fixed portion of the plug 24 includes a center axial beam 26 on which the sliding portion 34 slides and which projects into and extends through an axial opening through the sliding portion 34. The center beam 26 is generally hollow in order to minimize its weight, and in the installation shown in FIGS. 3 and 4 the beam takes essentially the form of a hollow tube 26. The fixed portion 26, 28 of the plug 24 also includes a coaxial forward sleeve 28 into which the forward end of the sliding portion 34 of the plug 24 is received when the sliding portion 34 is moved axially inwardly with respect to the nozzle 20.

The plug 24 is supported generally within the nozzle, preferably in a radially central position. In the nozzle 20 shown in FIGS. 3 and 4, the throat and exit areas are close to each other, and the aft portions of the support tube 26 and the sliding portion 34 extend axially aftwardly out of the nozzle 20. The means for supporting and positioning the plug 24 may of course take a variety of forms. In the preferred embodiment shown in the drawings, the support means includes a number of fasteners that attach the inner end of support tube 26 to a plug attach flange 32 on the engine body 47. The fasteners are spaced circumferentially around the flange and the inner end of tube 26.

The sliding portion 34 of the plug 24 includes first and second expansible chambers 36, 38. The first chamber 36 is located forward of the second chamber 38. Each of the chambers 36, 38 is defined by both wall portions of the support tube 26 and wall portions that are part of the sliding portion 34. In chamber 36, a pressure surface 40 is formed by a chamber wall that is part of the sliding portion 34 of the plug 24, and in chamber 38 a pressure surface 42, 43 is formed by chamber walls that are also part of said portion 34. When fluid pressure is introduced into the respective chamber 36, 38, it acts against the pressure surface 40, 42, 43 to move the sliding portion 34 in an axial direction and expand the chamber 34, 36.

In the preferred embodiment, the fluid pressure for pressurizing each of the chambers 36, 38 is obtained by directing bleed air from the engine compressor into the chamber to be pressurized. The pressurized bleed air is supplied to each chamber 36, 38 through tubing 44, 46 that extends through a fairing 30 (which provides a streamlined enclosure), the sleeve 28, and the support tube 26 and terminates at an inlet opening into the respective chamber 36, 38. The inlet openings into the chambers 36, 38 are formed in a chamber wall defined by an outer wall of the support tube 26, as shown in the drawings. This arrangement makes it possible to move the sliding portion 34 of the plug 24 in either axial direction without the need for any moving parts or control apparatus in the severe environment of the primary flow other than the single moving part consisting of the sliding portion 34. The preferred embodiment of the control system of the apparatus of the invention is described further below.

In the preferred embodiment of the apparatus shown in the drawings, the first chamber 36 is positioned forward of the second chamber 38 and the two chambers 36, 38 are separated by a bulkhead 48 and seal 50 that are a part of the fixed portion of the plug 24. This arrangement provides relatively simple and very efficient operation of the sliding portion 34 and efficient use of space. The bulkhead 48 is carried by the support tube 26 and extends generally radially outwardly from the tube 26. The seal 50 is carried by the outer radial end of the bulkhead 48 and sealingly engages an inner wall surface of the sliding portion 34.

The forward chamber 36 is defined by an axially extending wall of the support tube 26 positioned forward of the bulkhead 48, the bulkhead 48, an axially extending wall of sliding portion 34 spaced radially outwardly from support tube 26, and pressure surface 40 formed by a forward generally radially extending wall of sliding portion 34. The aft chamber 38 is formed by a tapered sidewall of the tube 26 located aftward of the bulkhead 48, the axially extending wall of support tube 26 located aftward of the tapered sidewall, pressure surface 42, 43 formed by an aft generally radially extending wall 43 of sliding portion 34 of the aftwardly tapered outer wall 42 of the sliding portion 34, and the bulkhead 48.

As the sliding portion 34 slides axially, an aft bearing 54 carried by the radially inner end of the radial wall 43 slidingly engages the aft axially extending circumferential wall of the tube 26. A forward bearing 56 is carried by the inner end of the wall forming pressure surface 40 in chamber 36 and slidingly engages the forward portion of support tube 26 as the sliding portion 34 slides axially. This arrangement minimizes the number of bearing surfaces required and contributes to the reliability and efficient operation of the apparatus. Moreover, since the supply of bleed air from the compressor would normally be much greater than is required to operate the apparatus, some leakage on the sealing and bearing surfaces is tolerable and can even be desirable. Therefore, the tolerances on the bearings may be loose without adversely affecting the operation of the system.

In the operation of the system, pressure is supplied to aft chamber 38 to move and maintain the sliding portion 34 of the plug 24 in its stowed aft position shown in FIG. 3 during operation of the aircraft in its forward mode. The forward mode of a high-bypass ratio turbofan installation is illustrated in FIG. 1. In the preferred embodiment of the apparatus of the invention, a regulated stowing pressure is continuously supplied to chamber 38 during all operating modes in order to bias the sliding portion 34 into its forward mode position. Thus, in the absence of a specific signal to deploy the sliding portion 34 into its reverse position (i.e. in the absence of the pressurization of forward chamber 36), the sliding portion 34 of the plug 24 will always be moved into and held in its forward mode position shown in FIG. 3.

When fluid pressure is supplied to forward chamber 36 by allowing bleed air from the engine compressor through tubing 44 into chamber 36, the pressure acts on pressure surface 40 to move the sliding portion 34 axially inwardly with respect to the nozzle 20 into its reverse mode position shown in FIG. 4. As can be seen in FIGS. 3 and 4, the movement of the tapered section of sliding portion 34 adjacent to the throat area 22 of the nozzle 20 causes the throat area to vary. The throat area is greater in the reverse mode than in the forward mode. The increase in the throat area caused by the deploying of the sliding portion 34 creates a reduction in the primary aftwardly directed thrust without the need for redirecting the primary flow. The opening up of the nozzle throat area 22 produces an overall change in the engine cycle that results in a lower primary total pressure in the nozzle 20 and thus less primary thrust. The reduction in the aftwardly directed primary thrust makes the redirection of the fan thrust in a generally forward direction more efficient to provide the aircraft with more efficient braking action. p In order to prevent damage to the apparatus and surrounding structures due to high impact loads, the system of the invention is preferably provided with means for stopping movement of the sliding portion 34 of the plug 24 relatively gradually at either end of its axial travel. Both the means for stopping forward axial movement and the means for stopping aftward axial movement would generally include a stop surface against which the sliding portion 34 comes to rest at the end of its travel. The purpose of the stop surfaces is to prevent any residual momentum of the sliding portion 34 from causing it to overtravel beyond either its stowed or its deployed position. Other means are provided for slowing the motion of the sliding portion 34 in either direction.

In the preferred embodiment of the apparatus of the invention, the slowing of the outward or aftward axial movement of the sliding portion 34 of the plug 24 is provided by the controlled leakage of fluid out of the forward chamber 36 as the sliding portion 34 slides aftwardly and chamber 36 contracts. The aftward movement of sliding portion 34 moves pressure surface 40 toward bulkhead 48 to compress the fluid in chamber 36. If bearing 56 were fluid tight and no other possible fluid outlets were provided in chamber 36, the compression of the air in chamber 36 would halt aftward movement of the sliding portion 34 at some point before portion 34 reached its aft stop. In the preferred embodiment, leakage out of chamber 36 at a predetermined rate is provided by leakage around forward bearing 56 in order to control the compression of the air in chamber 36. The controlled compression of the fluid slows the rate of movement of the sliding portion 34 to allow it to gradually come to a stop against its aft stop surface in its stowed position. This approach to providing a gradual slowing of the aftward movement of portion 34 is extremely reliable since it requires no control apparatus and is very simple in construction and operation.

Figure 7:
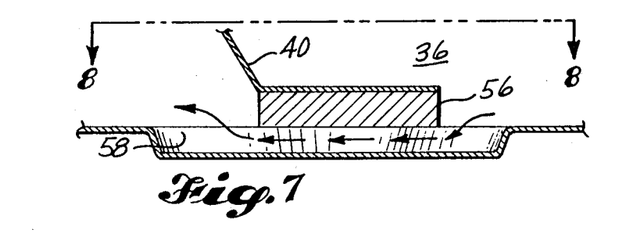
FIG. 7 is an enlarged fragmentary vertical sectional view of the apparatus shown in FIGS. 3–6, illustrating the forward bearing carried by the sliding portion of the plug adjacent to the opening in the center axial support beam.
Figure 8:
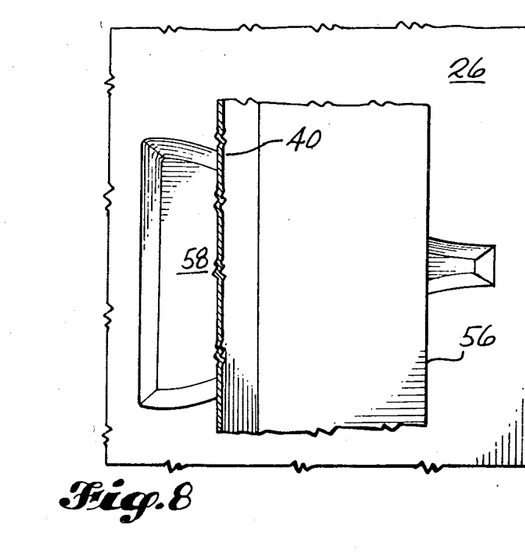
FIG. 8 is a fragmentary top plan view of the features shown in FIG. 7, with parts shown in section.

The preferred embodiment of the means for slowing forward axial movement of sliding portion 34 is shown in FIGS. 7 and 8. The slowing of forward movement, like the slowing of aftward movement, is provided by a controlled leakage of fluid out of forward chamber 36. To accomplish this controlled leakage, the outer surface of support tube 26 along which forward bearing 56 slides as sliding portion 34 approaches its deployed position is provided with an opening 58. This opening 58 increases in circumferential extent from its aft end to its forward end. The preferred shape for the opening 58 is most clearly shown in FIG. 8.

When chamber 36 is pressurized to move sliding portion 34 from its stowed to its deployed position, bearing 56 slides along support tube 26 and a portion of bearing 56 moves across the opening 58 in tube 26. This allows fluid to leak out of chamber 36 around the inner portion of the part of bearing 56 that is adjacent to the opening 58. This is most clearly illustrated in FIG. 7. As the sliding portion 34 continutes to move in a forward direction, the circumferential extent of the leakage increases as the circumferential extent of the opening 58 increases. The shape of the opening 58 is designed to control the leakage at a desired predetermined rate that increases at a desired rate as the sliding portion 34 approaches its deployed position. Since fluid pressure is continuously being supplied to chamber 38 through tubing 46, as leakage out of chamber 36 increases an equilibrium is gradually created between the force due to the fluid pressure in chamber 36 tending to more portion 34 forwardly and the force due to the fluid pressure in chamber 38 tending to move portion 34 aftwardly. When portion 34 reaches its fully deployed position and comes to a rest against its forward stop, the forces exerted on the pressure surfaces 40, 42, 43 of the two chambers 36, 38 are essentially in equilibrium and the pressure in chamber 36 is preferably just sufficient to hold sliding portion 34 in its deployed position against the force biasing portion 34 toward its stowed position.

Figure 9:
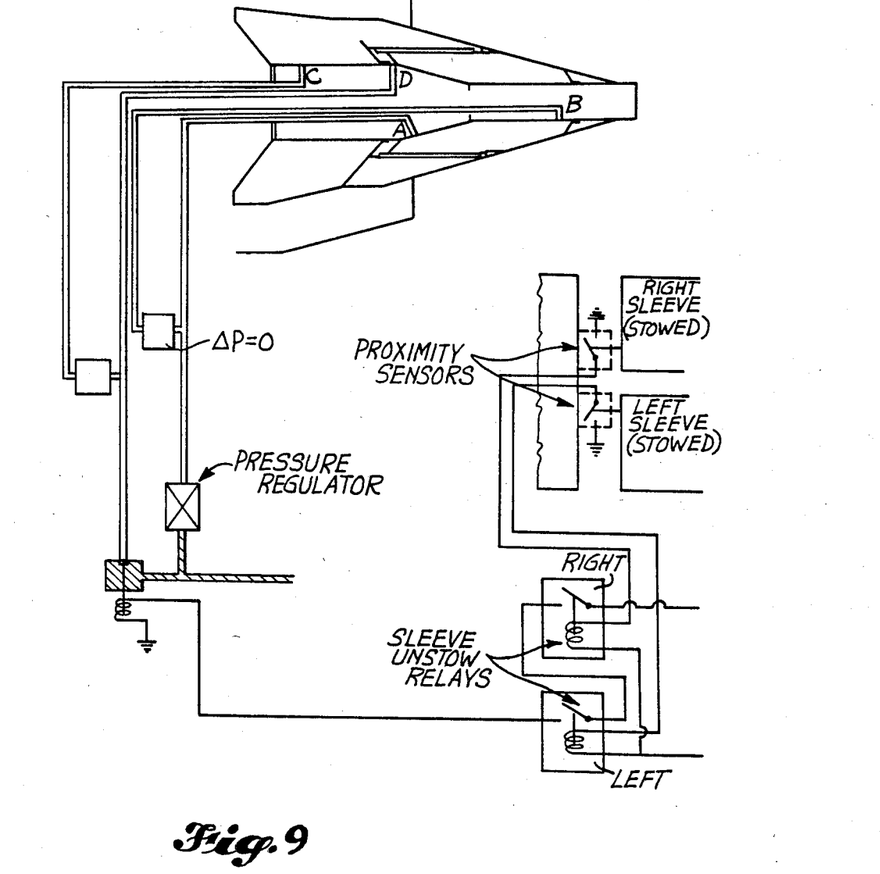
FIG. 9 is a schematic view of the control system of the preferred embodiment, showing the system in its forward thrust mode.
Figure 10:
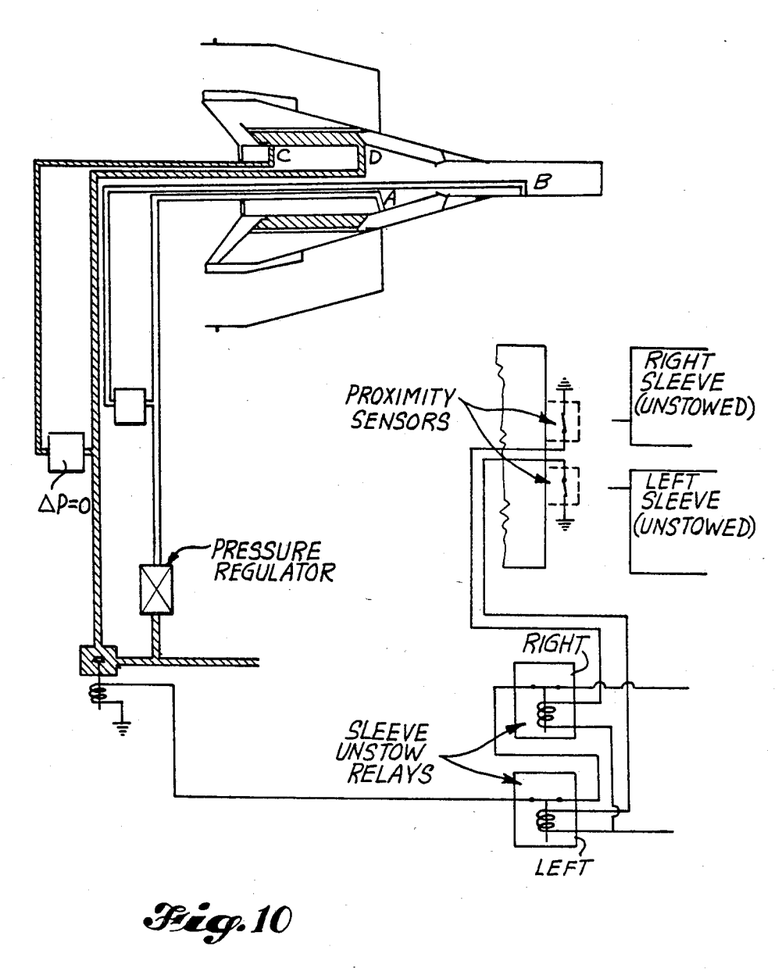
FIG. 10 is like FIG. 9 except that it shows the system in its reverse thrust mode.

The control of the supply of pressurized bleed air to chambers 36, 38 and thus the control of the position of sliding portion 34 of plug 24 may be accomplished by a variety of means. FIGS. 9 and 10 illustrate in schematic form the best mode of the control system currently known to the applicant. The control system includes sensors that sense the position of sliding portion 34 and valves that regulate the supply of fluid pressure to each chamber 36, 38. Both the sensors and the valves are located outside the harsh environment of the primary flow. FIG. 9 shows the configuration of the control system when the sliding portion 34 is in its aftward stowed position, and FIG. 10 shows the configuration when portion 34 is in its forward deployed position.

Pressure taps at locations A, B, C, D transmit pressure to pressure transducers 62, 64 located outside the nozzle 20. The pressures at tap locations A and B are compared by transducer 62. When the system is in its forward operational mode, both locations A and B are contained within expanded chamber 38 and thus the pressures at locations A and B should be identical. When transducer 62 receives essentially identical pressures from taps A and B, a signal is sent out by transducer 62 that indicates that sliding portion 34 is in its stowed position. Similarly, taps C and D transmit pressures to transducer 64. When sliding portion 34 is in its deployed position, both pressure tap locations C and D are within forward chamber 36 and thus both taps C and D transmit essentially identical pressures to transducer 64. Transducer 64 compares the pressures at locations C and D and sends out a signal that sliding portion 34 is in its deployed position.

The control system also includes proximity sensors of a well-known type. Such proximity sensors are generally included on each reverser sleeve in any installation having thrust reversers. The proximity sensors sense movement of the fan flow reverser sleeves toward their reverse positions and produce a signal to cause sleeve unstow relays to close. These relays, like all the sensitive control apparatus of the system are located in an engine accessory unit protected from the harsh environment of the primary flow. The sleeve unstow relays are connected in series so that when both are closed, power is supplied to a valve 66 to open the valve 66 to allow bleed air to move through tubing 44 into forward chamber 36 and thereby move the sliding portion 34 toward its reverse mode position. As described above, the supply of bleed air to aft chamber 38 is continuously maintained. The proper operation of the system can be monitored by the pilot by checking the signals from transducers 62 and 64.

Figure 11:
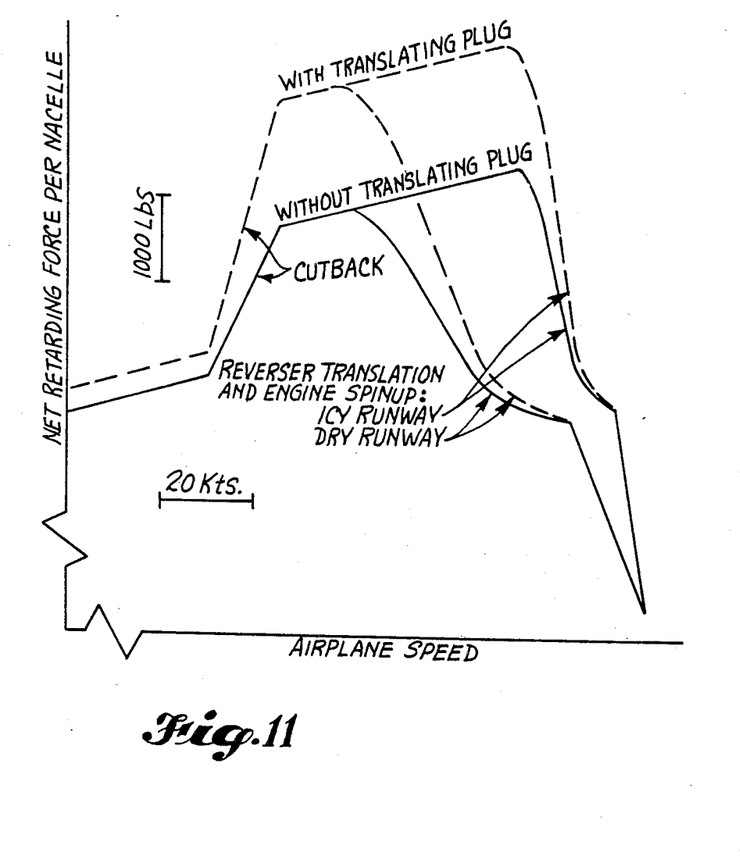
FIG. 11 is a graphical illustration of net reverse thrust versus aircraft speed in a conventionally equipped aircraft and in an aircraft into which apparatus constructed according to the invention has been incorporated.

FIG. 11 illustrates the performance of a typical known fan thrust reverser with and without the incorporation of the apparatus of the invention. In FIG. 11, the net retarding force is plotting as a function of the forward speed of the aircraft. The curves shown in FIG. 11 were developed with the assumption that takeoff power is held as the speed of the aircraft reduces to a given value, at which point it is necessary to reduce the power to prevent engine surging. Power is reduced continuously to a lower setting which is then held until the aircraft is stopped. The reverse thrust performance shown in FIG. 11 includes the amount by which drag is reduced due to the effects of reverse efflus.

As can be clearly seen in FIG. 11, the benefits of the apparatus of the invention are obtained primarily at the high takeoff power setting of the engine. Therefore, the longer the engine is held at high power, the greater the improvement in braking action provided by the apparatus of the invention. The length of time during which high power may be maintained is affected by both the amount of time it takes the engine to reach takeoff power from idle once the reversers are engaged and by the cutoff speed at which power has to be reduced to prevent engine surge. In the case of an emergency stop on a dry runway with good braking friction, the aircraft will generally slow to the cutoff speed just as the engine reaches takeoff power. When runway conditions are relatively poor, the time it takes the aircraft to decelerate a given amount will be longer and the beneficial effects of the apparatus of the invention will be greater.

Figure 12:
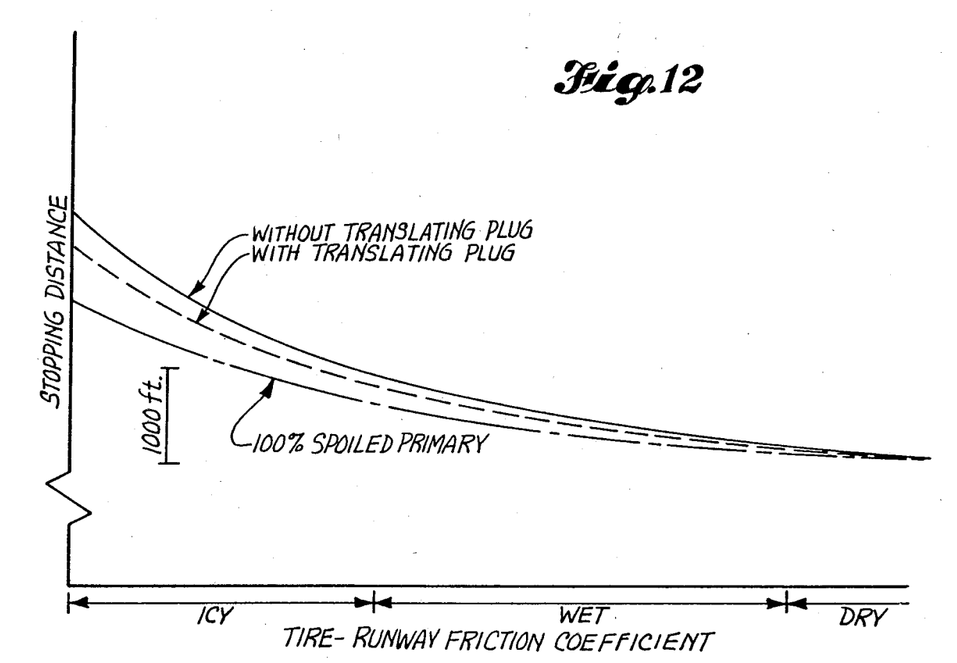
FIG. 12 is a graphical illustration of stopping distance versus aircraft tire-runway friction coefficient in a conventionally equipped aircraft, in an aircraft equipped with apparatus constructed according to the invention, and in a hypothetical aircraft in which the aftward primary thrust has been reduced to zero.

FIG. 12 is a graph of the relationship between aircraft stopping distance and runway friction coefficient. The graph includes three curves illustrating three different situations. The lowest curve shows the effect of eliminating all of the primary thrust. As a practical matter it is extremely difficult to eliminate all of the primary thrust, and the lowest curve is intended to show the maximum theoretically obtainable benefit which may be produced by reducing primary thrust. The uppermost curve illustrates the relationship between stopping distance and runway friction coefficient for an installation such as the one shown in FIGS. 1 and 2 lacking the apparatus of the invention. The middle curve shows the relationship for an installation into which the preferred embodiment of the apparatus of the invention has been incorporated. As can be clearly seen in FIG. 12, the apparatus of the invention provides a sizeable fraction of the theoretically obtainable benefit of reducing primary thrust.

Apparatus constructed according to the invention provides a great improvement in overall reverse thrust performance of systems such as the high-bypass ratio turbofan installation shown in FIGS. 1 and 2. The performance improvement is accomplished without the need for overly complex apparatus or procedures and without significantly adding to the weight of the aircraft. Apparatus constructed according to the invention is highly reliable and simple to operate and requires only a single moving part in the nozzle environment, the sliding portion of the nozzle plug. The great advantages stemming from the ability to locate sensitive control apparatus and moving parts in locations remove from the nozzle environment are discussed above. To summarize, the apparatus of the invention provides an economical, efficient, and reliable means for varying the size of flow path cross sections in power device nozzles.

It will be obvious to those skilled in the art to which this invention is addressed that the invention may be used to advantage in a variety of situations. Therefore, it is also to be understood by those skilled in the art that various changes, modifications, and omissions in form and detail may be made without departing from the spirit and scope of the present invention as defined by the following claims.

What is claimed is:

1. Apparatus for varying the cross-sectional area of a flow path in an exhaust nozzle of a power device, comprising:

a nozzle plug having a sliding portion, and a fixed portion; said sliding portion including an axial opening; said fixed portion including a center axial support beam which projects into said opening, on which said sliding portion slides, and which has radially outer surface portions; said sliding and fixed portions together defining first and second expansible chambers radially between said sliding portion and said beam; and each of said chambers being partially defined by said outer surface portions of said beam;

means for mounting said beam to the power device, to support the plug in position at least partially within the exhaust nozzle; and first and second operating means for introducing fluid pressure into said first and second expansible chambers, respectively, to act against said sliding portion and cause said sliding portion to slide axially inwardly and outwardly, respectively, with respect to the nozzle;

said sliding portion being shaped so that the cross-sectional area of the plug, at each axial station along at least a portion of the axial length of the plug, changes when the sliding portion slides axially, to change the cross-sectional area of an adjacent portion of the nozzle flow path.

2. Apparatus as described in claim 1, wherein said fixed portion of the plug is cantilevered and further includes an annular sleeve which is essentially coaxial with said beam and into which an inner end portion of said sliding portion is received when said sliding portion slides inwardly with respect to the nozzle.

3. Apparatus as described in claim 1, in which fluid pressure is continuously supplied by one of the first and second operating means to the respective expansible chamber to bias said sliding portion of the plug in a desired axial direction.

4. Apparatus as described in claim 1, further comprising inward stop means and outward stop means for gradually stopping inward and outward axial sliding movement of said sliding portion of the plug, respectively.

5. Apparatus as described in claim 4, which further comprises bearing means between said fixed portion and said sliding portion; and in which one of said stop means includes controlled leakage means for allowing leakage of fluid around said bearing means out of one of the expansible chambers at a predetermined rate as said sliding portion slides axially and said one chamber contracts, to allow controlled compression of fluid in said one chamber to slow the rate of movement of said sliding portion.

6. Apparatus as described in claim 4, in which one of said operating means continuously supplies fluid pressure to its respective expansible chamber to bias said sliding portion of the plug axially in a desired direction; and one of said stop means includes controlled leakage means for allowing leakage of fluid out of the other expansible chamber at a predetermined rate that increases as said sliding portion slides axially in a direction opposite to said desired direction and said other chamber expands, to gradually create an equilibrium between the force due to the fluid pressure in said other chamber tending to slide said sliding portion in said opposite direction and the force due to the fluid pressure in said respective chamber tending to slide said sliding portion in said desired direction.

7. Apparatus as described in claim 6, wherein said controlled leakage means includes an opening on said outer surface portions of said beam.

8. Apparatus as described in claim 1, further comprising control means for controlling the first and second operating means to thereby control the position of said sliding portion of the plug; said control means including sensor means for sensing the position of said sliding portion, and valve means located outside the nozzle for regulating the supply of fluid pressure to each chamber.

9. Apparatus as described in claim 1, in which the axially outer end portion of said sliding portion includes an axially outwardly tapering wall adjacent to the nozzle flow path; said opening extends axially through said sliding portion; and said beam projects axially outwardly from said wall into the atmosphere.

10. Apparatus as described in claim 9, in which said second expansible chamber is located axially outward of said first expansible chamber and is partially defined by said wall.

11. Apparatus as described in claim 9, in which said beam has an axially inner portion with a first diameter, an axially outer portion with a second diameter that is smaller than said first diameter, and an intermediate tapering portion connecting said inner and outer portions; and said outer portion projects axially outwardly from said wall.

12. Apparatus for varying a throat area in a nozzle of a jet engine in a jet aircraft, comprising:
 a nozzle plug having a fixed portion, and a sliding portion; said sliding portion including an axial opening, and a tapered aft end portion; said fixed portion including a center axial support beam which projects into said opening, on which said sliding portion slides, and which has radially outer surface portions; said fixed and sliding portions together defining first and second expansible chambers radially between said sliding portion and said beam; and each of said chambers being partially defined by said outer surface portions of said beam;
 means for mounting said beam to the engine, to support the plug in position at least partially within the nozzle;
 first operating means for introducing fluid pressure into said first expansible chamber to act against said sliding portion and cause said sliding portion to slide axially with respect to the nozzle in one direction and thereby increase the nozzle throat area; and
 second operating means for introducing fluid pressure into said second expansible chamber to act against said sliding portion and cause said sliding portion to slide axially with respect to the nozzle in the opposite direction and thereby decrease the nozzle throat area.

13. Apparatus as described in claim 12, wherein said fixed portion of the plug is cantilevered and further includes an annular sleeve which is essentially coaxial with said beam and into which a forward end portion of said sliding portion is received when said sliding portion slides inwardly with respect to the nozzle.

14. Apparatus as described in claim 12, in which fluid pressure is continuously supplied by one of the first and second operating means to the respective expansible chamber to bias said sliding portion of the plug in a desired axial direction.

15. Apparatus as described in claim 12, further comprising control means for controlling the first and second operating means to thereby control the position of said sliding portion of the plug; said control means including sensor means for sensing the position of said sliding portion, and valve means located outside the nozzle for regulating the supply of fluid pressure to each chamber.

16. Apparatus as described in claim 12, in which the tapered aft end portion of said sliding portion includes an aftwardly tapering wall adjacent to the nozzle throat area, said opening extends axially through said sliding portion, and said beam projects axially outwardly from said wall into the atmosphere.

17. Apparatus as described in claim 16, in which said second expansible chamber is located axially outward of said first expansible chamber and is partially defined by said wall.

18. Apparatus as described in claim 16, in which said beam has an axially inner portion with a first diameter, an axially outer portion with a second diameter that is smaller than said first diameter, and an intermediate tapering portion connecting said inner and outer portions; and said outer portion projects axially outwardly from said wall.

19. Apparatus as described in claim 12, in which said opening extends axially through the sliding portion; said beam projects axially outwardly from said aft end portion of the sliding portion; and said beam has a hollow, generally tubular configuration.

20. Apparatus as described in claim 19, in which said aft end portion of the sliding portion includes an aftwardly tapering wall adjacent to the nozzle throat area; and said second expansible chamber is located axially outward of said first expansible chamber and is partially defined by said wall.

21. Apparatus as described in claim 19, in which said beam has an axially inner portion with a first diameter, an axially outer portion with a second diameter that is smaller than said first diameter, and an intermediate tapering portion connecting said inner and outer portions; and said outer portion projects axially outwardly from said wall into the atmosphere.

22. Apparatus as described in claim 12, further comprising forward stop means and aft stop means for gradually stopping forward and aftward axial sliding movement of said sliding portion of the plug, respectively.

23. Apparatus as described in claim 22, which further comprises bearing means between said fixed portion and said sliding portion; and in which one of said stop means includes controlled leakage means for allowing leakage of fluid around said bearing means out of one of the expansible chambers at a predetermined rate as said sliding portion slides axially and said one chamber contracts, to allow controlled compression of fluid in said one chamber to slow the rate of movement of said sliding portion.

24. Apparatus as described in claim 22, in which one of said operating means continuously supplies fluid pressure to its respective expansible chamber to bias said sliding portion of the plug axially in a desired direction; and one of said stop means includes controlled leakage means for allowing leakage of fluid out of the other expansible chamber at a predetermined rate that increases as said sliding portion slides axially in a direction opposite to said desired direction and said other chamber expands, to gradually create an equilibrium between the force due to the fluid pressure in said other chamber tending to slide said sliding portion in said opposite direction and the force due to the fluid pressure in said respective chamber tending to slide said sliding portion in said desired direction.

25. Apparatus as described in claim 24, wherein said controlled leakage means includes an opening on said outer surface portions of said beam.

* * * * *